United States Patent
Tiana et al.

(10) Patent No.: US 10,308,371 B1
(45) Date of Patent: Jun. 4, 2019

(54) SPATIALLY MODULATED AND TEMPORALLY SEQUENCED MULTI-STREAM VISION SYSTEM

(71) Applicant: Rockwell Collins, Inc., Cedar Rapids, IA (US)

(72) Inventors: Carlo L. Tiana, Portland, OR (US); Weston J. Lahr, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 271 days.

(21) Appl. No.: 15/089,185

(22) Filed: Apr. 1, 2016

Related U.S. Application Data (60) Provisional application No. 62/310,468, filed on Mar. 18, 2016.

(51) Int. Cl.

| | |
|---|---|
| *G01C 21/20* | (2006.01) |
| *G06T 11/00* | (2006.01) |
| *G06T 15/20* | (2011.01) |
| *G06T 17/05* | (2011.01) |
| *B64D 45/00* | (2006.01) |
| *H04N 5/225* | (2006.01) |
| *G01C 23/00* | (2006.01) |
| *G08G 5/00* | (2006.01) |

(52) U.S. Cl.
CPC ............ *B64D 45/00* (2013.01); *G01C 23/00* (2013.01); *G08G 5/0086* (2013.01); *H04N 5/225* (2013.01)

(58) Field of Classification Search
None
See application file for complete search history.

(56) References Cited

U.S. PATENT DOCUMENTS

| | | |
|---|---|---|
| 5,394,517 A | 2/1995 | Kalawsky |
| 5,625,765 A | 4/1997 | Ellenby et al. |
| 6,597,818 B2 | 7/2003 | Kumar et al. |
| 6,690,298 B1 | 2/2004 | Barber et al. |
| 7,352,292 B2 | 4/2008 | Alter et al. |
| 7,925,117 B2 | 4/2011 | Hamza et al. |
| 7,940,285 B2 | 5/2011 | Would et al. |
| 7,965,202 B1 | 6/2011 | Chiew et al. |
| 8,049,644 B1 | 11/2011 | Oehlert et al. |
| 8,094,188 B1 | 1/2012 | Yum et al. |
| 8,099,234 B1 | 1/2012 | Frank et al. |

(Continued)

*Primary Examiner* — Thomas G Black
*Assistant Examiner* — Demetra R Smith-Stewart
(74) *Attorney, Agent, or Firm* — Angel N. Gerdzhikov; Donna P. Suchy; Daniel M. Barbieri (57) ABSTRACT

A system and related method for managing images generated by a combined vision system (CVS) and displayed by an aircraft via an onboard PFD HDD, HUD, or HWD includes combining sensor image streams of an enhanced vision system (EVS) with navigation and terrain symbology generated by a synthetic vision system (SVS) to optimize the useful information displayed at any given point. Areas corresponding to prescribed visual references (approach lighting, runways and runway markers) that must be identified via pure EVS under certain conditions may be excluded from the SVS visual channels so that only a pure EVS channel of the excluded areas is displayed. The CVS may include edge filtering to remove unimportant terrain features and emphasize ridgelines. The CVS may display a full field of view for all selected visual channels or sensors, and optionally indicate where fields of view overlap.

20 Claims, 7 Drawing Sheets

(56) References Cited

U.S. PATENT DOCUMENTS

| | | | |
|---|---|---|---|
| 8,264,498 B1 | 9/2012 | VanDerKamp et al. | |
| 8,384,730 B1 | 2/2013 | VanDerKamp et al. | |
| 8,462,019 B1 | 6/2013 | VanDerKamp et al. | |
| 8,493,412 B2 | 7/2013 | Suddreth et al. | |
| 8,571,728 B1 | 10/2013 | Wenger et al. | |
| 8,687,056 B2 | 4/2014 | Yahav et al. | |
| 8,723,696 B1 | 5/2014 | VanderKamp et al. | |
| 8,773,288 B1 | 7/2014 | Carrico et al. | |
| 8,917,191 B1 * | 12/2014 | Tiana | G01C 23/00 340/945 |
| 8,965,601 B1 | 2/2015 | Barber | |
| 8,976,042 B1 | 3/2015 | Chiew et al. | |
| 9,000,952 B1 | 4/2015 | Vanderkamp et al. | |
| 9,105,115 B2 * | 8/2015 | Feyereisen | G06T 11/00 |
| 9,142,185 B2 | 9/2015 | Fateh | |
| 9,174,746 B1 | 11/2015 | Bell et al. | |
| 9,176,324 B1 | 11/2015 | Scherer et al. | |
| 9,177,204 B1 * | 11/2015 | Tiana | G06K 9/2018 |
| 9,222,800 B1 | 12/2015 | Scherer et al. | |
| 9,245,378 B1 | 1/2016 | Villagomez et al. | |
| 9,245,450 B1 | 1/2016 | Chiew et al. | |
| 9,262,932 B1 | 2/2016 | Barber et al. | |
| 9,384,586 B1 * | 7/2016 | McCusker | G08G 5/0021 |
| 9,428,056 B2 * | 8/2016 | Kneuper | B60K 35/00 |
| 9,733,349 B1 * | 8/2017 | Wood | G01S 13/02 |
| 2007/0176794 A1 * | 8/2007 | Feyereisen | G01C 23/00 340/970 |
| 2014/0225917 A1 | 8/2014 | Ellenby et al. | |
| 2014/0267422 A1 | 9/2014 | Feyereisen et al. | |
| 2015/0073696 A1 * | 3/2015 | Servantie | G01C 23/00 701/409 |
| 2015/0146297 A1 * | 5/2015 | Commander | B42D 25/30 359/627 |

\* cited by examiner

SPATIALLY MODULATED AND TEMPORALLY SEQUENCED MULTI-STREAM VISION SYSTEM

CROSS-REFERENCE TO RELATED APPLICATIONS

This application claims priority under 35 U.S.C. § 119(e) to provisional U.S. Patent Application Ser. No. 62/310,468, filed on Mar. 18, 2016. Said provisional U.S. Patent Application 62/310,468 is herein incorporated by reference in its entirety.

BACKGROUND

Low-visibility aviation operations may be enhanced by electronic visual aids, such as Enhanced Vision Systems (EVS) and Synthetic Vision Systems (SVS) configured for operation in infrared (IR) or radio frequency (RF) spectral bands as well as the visible band. EVS, SVS, and other imaging streams may be simultaneously piped into the cockpit and combined into a single Combined Vision System (CVS) that obviates the need for manual selection of the most useful stream by the pilot or crew as well as the need for the pilot or crew to evaluate the contributions of each individual stream.

A single, cohesive imaging stream incorporating multiple varied sensor sources holds great potential benefit to the situational awareness of the pilot or crew. However, individual imaging streams play specific roles depending on the current flight segment (approach, landing, taxi, takeoff) and the use of particular sources may be mandated or precluded by regulations. For example, FAA operating rules may preclude the use of SVS below a certain altitude AGL; further, EVS may only be used as a visual means of positioning and navigation provided the pilot or crew are able to detect via EVS specific, predetermined visual references indicative of the airfield such as approach lighting or runway markings.

SUMMARY

In one aspect, embodiments of the inventive concepts disclosed herein are directed to a combined vision system (CVS) for managing images displayed via a display unit of an aircraft. The CVS may include an enhanced vision system (EVS) which generates visual channels (e.g., image streams) of images sensed by imaging sensors aboard the aircraft. The sensed images may correspond to a field of view (FOV) representing that portion of the environment surrounding the aircraft which is "visible" to the imaging sensor. The CVS may include a synthetic vision system (SVS) which cross-references the position of the aircraft with navigational and terrain databases to generate synthetic images, e.g., visual representations of manmade and natural features as well as runways, approach lighting, and other airfield-specific features. The synthetic images may also correspond to FOV based on portions of the aircraft environment "visible" from the aircraft position or from another position selected by the SVS. The CVS may include display electronics coupled to a primary flight display (PFD), head-down display (HDD), head-up display (HUD), head-worn display (HWD), or other display unit of the aircraft. The display electronics may generate a combined visual channel by selecting the visual channels currently providing useful visual intelligence and combining the selected visual channels with synthetic images corresponding to the FOV of the selected visual channels. The display electronics may remove selected synthetic images from the combined visual channels based on the position of the aircraft; for example, removing synthetic images corresponding to approach lighting, runway markings, or other airfield-specific visual references so that the visual references may be identified via pure EVS sensor imagery.

In a further aspect, embodiments of the inventive concepts disclosed herein are directed to an apparatus for managing images displayed via a display unit of an aircraft. The apparatus may include aircraft-based imaging sensors (e.g., visible-band, infrared, radar, millimeter-wave) for sensing images corresponding to a FOV, the FOV associated with a portion of the environment proximate to the aircraft. The apparatus may include an EVS coupled to the imaging sensors, including EVS processors for generating image streams based on the sensed images. The apparatus may include an SVS for generating synthetic images based on navigation or terrain databased and a position of the aircraft determined by onboard position sensors. The generated synthetic images may correspond to a particular field of view and to the aircraft itself, a natural feature, a manmade feature, or an airfield feature such as an ALS or runway. The apparatus may include display electronics for generating combined vision streams by combining the EVS image streams and SVS synthetic images; the display electronics may remove from the combined vision streams selected synthetic images corresponding to identified portions of the environment surrounding the aircraft. The apparatus may include a display unit (PFD, HDD, HUR, or HWD) for displaying the combined vision streams to the pilot or crew of the aircraft.

In a still further aspect, embodiments of the inventive concepts disclosed herein are directed to a method for managing images displayed via a PFD, HDD, HUD, HWD, or other display unit of an aircraft. The method may include sensing, via imaging sensors of the aircraft, images corresponding to a FOV associated with a portion of the environment surrounding the aircraft and "visible" to the imaging sensors. The method may include generating, via an EVS of the aircraft, visual channels based on the sensed images. The method may include generating, via a SVS of the aircraft, synthetic images by cross-referencing the aircraft position with navigational and terrain databases. The synthetic images may represent a FOV based on a portion of the aircraft environment "visible" from the aircraft position, and correspond to the aircraft itself, to manmade or natural features, or to airfield-specific features, lighting and markings. The method may include generating, via display electronics of the aircraft, a combined vision channel by combining selected visual channels and corresponding synthetic images (e.g., where the FOV of the synthetic images corresponds to the FOV of the selected visual channels). The method may include removing, via the display electronics, selected synthetic images from the combined visual channel, and displaying the combined visual channel via the display unit.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a multi-stream vision system, or combined vision system (CVS), configured for reduced-visibility flight operations. By delivering a visual equivalent through a broad variety of sensors and imaging streams, the CVS may provide a pilot or crew with equivalent situational awareness in poor weather or in degraded visual environments (DVE) to that in favorable conditions. In addition, the CVS may spatially and temporally monitor the presentation of each individual vision stream to maximize useful visual information and comply with regulations governing the use of visual enhancements.

Figure 1A:
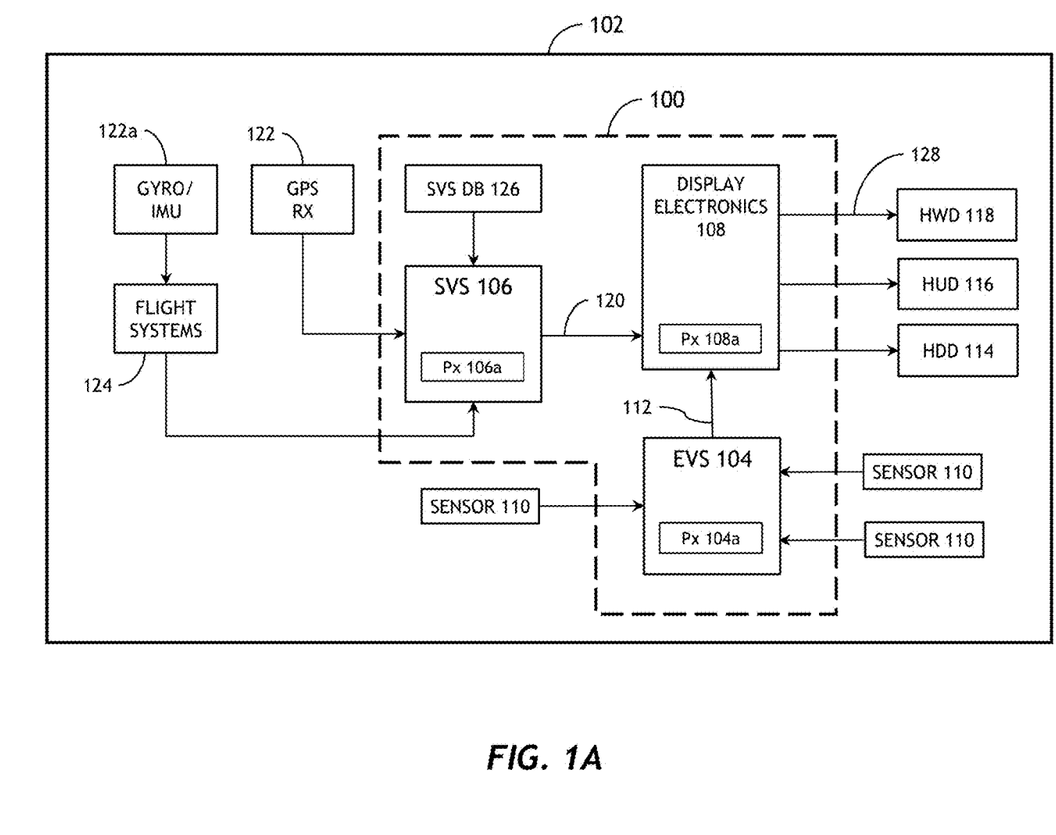
FIG. 1A is a block diagram illustrating an exemplary embodiment of a combined vision system (CVS) according to the inventive concepts disclosed herein.

Referring to FIG. 1A, an exemplary embodiment of a CVS 100 according to the inventive concepts disclosed herein is shown. The CVS 100 may be implemented aboard an aircraft 102 and may include an enhanced vision system (EVS) 104, a synthetic vision system (SVS) 106, and display electronics 108. The EVS 104 may incorporate cameras or onboard sensors 110 positioned aboard the aircraft 102 to collect visual information from the environment surrounding the aircraft 102 and detect elements of the aircraft environment for display. The onboard sensors 110 of the EVS 104 may include visible-band cameras or imaging sensors or electromagnetic (EM) sensors associated with spectral bands outside the visible band, such as infrared (IR) imaging sensors (e.g., near-infrared (NIR), short-wave infrared (SWIR), medium-wave infrared (MWIR), long-wave infrared (LWIR)) for enhanced visibility in a degraded visual environment (DVE) when visible-band sensors may be hindered by, e.g., darkness, smoke, haze, or humidity. The onboard sensors 110 of the EVS 104 may include weather radar (WxR) or other radar sensors, millimeter-wave (mmW) sensors, or multispectral sensor arrays. Each onboard sensor 110 may have a given field of view (FOV) representative of the portion of the environment surrounding the aircraft 102 that is "visible" to the onboard sensor 110 (the FOV corresponding to the scope of the image captured by the onboard sensor 110). The FOV associated with a given onboard sensor 110, or with EM radiation sensed by the onboard sensor 110, may depend on multiple factors including the position of the sensor 110 (e.g., the mounting of the sensor 110 relative to the fuselage of the aircraft 102, the range of the sensor 110, or the spectral band/s of the sensor 110). The EVS 104 may process (via processors 104a) images or EM radiation captured by the onboard sensors 110 to extract, filter, enhance, or otherwise detect image elements for display to the pilot or crew of the aircraft 102, such as an Approach Lighting System (ALS). Images or EM radiation captured by the EVS 104, processed or unprocessed, may be forwarded as EVS image streams 112 to the display electronics 108 of the CVS 100 for display by a primary flight display (PFD) or other head-down display (HDD) 114, a head-up display (HUD) 116, or a helmet-mounted or other head-worn display (HWD) 118 aboard the aircraft 102.

The SVS 106 may provide additional situational awareness to the pilot/crew of the aircraft 102 by generating synthetic images (120) relevant to the environment surrounding the aircraft 102 based on the determined position of the aircraft. For example, the SVS 106 may continually assess the position of the aircraft 102 via an onboard GPS receiver 122 (or similar satellite-based absolute position receiver) of the aircraft, or via position data collected by gyroscopes, accelerometers, or similar inertial measurement units (IMU) 122a, which position data may be further processed by other flight systems 124 aboard the aircraft to assess a relative position of the aircraft. The SVS 106 may cross-reference (via SVS processor 106a) the determined position of the aircraft 102 with obstacle, terrain, and other navigational databases 126 to generate iconography, symbology, and other synthetic representations (synthetic images 120) of objects or features within the aircraft environment (as indicated by the determined position of the aircraft 102). Synthetic images 120 generated by the SVS 106 may indicate or highlight terrain features (e.g., flat land, bodies of water, mountains and rock formations) which may be differentiated from each other (and from the sky) via colorization. Synthetic images 120 generated by the SVS 106 may indicate or highlight airport or airfield features such as runways and runway zones (threshold, touchdown), airfield structures or towers, airfield lighting systems (runway, approach, taxi), IFR beacons and markers, and VFR waypoints.

Similarly to the EVS 104, the SVS 106 may also have a FOV. However, while the FOV of the EVS 104 is sensor-dependent (as described above) and therefore fixed, the FOV of the SVS 106 may be arbitrary or adjustable. The FOV of the SVS 106 (e.g., what is "visible" to the SVS 106 at any given moment) may be determined by the position of the aircraft 102; however, the range and orientation of the SVS 106 (e.g., how much of the aircraft environment is "visible" to the SVS 106, and from what distance and perspective) may be controllable by the pilot or crew. The FOV of the SVS 106, for example, may reflect the determined position of the aircraft 102 as seen from a position that may not reflect the position of a physical sensor or of any part of the aircraft 102 itself (e.g., from behind and above the aircraft 102, to show the relative position of the aircraft 102 and an airfield to which the aircraft 102 is on approach). Accordingly, the respective FOVs of the EVS 104 and the SVS 106 may not be equivalent to each other but may overlap, such that some or all of the images captured by the EVS 104 may be displayed with overlaid symbology generated by the SVS 106 and relevant to objects portrayed by the EVS image streams 112.

Figure 1B:
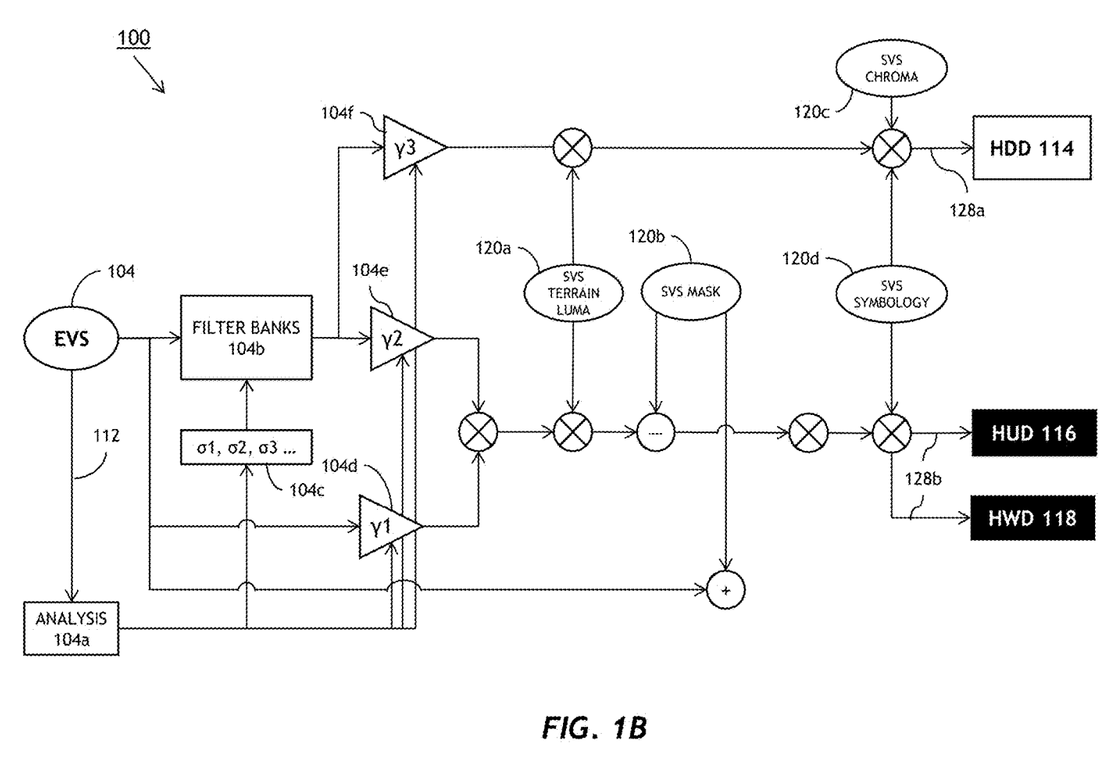
FIG. 1B is a schematic diagram illustrating the CVS of FIG. 1A.

Referring to FIG. 1B, a schematic diagram of operations by the CVS 100 of FIG. 1A is shown. The EVS 104 may receive image streams 112 based on images or EM radiation captured by onboard sensors 110 of the aircraft 102. The captured EVS image streams 112 may be further processed (via EVS processor 104a), filtered (via SVS filter banks 104b), smoothed via sigma filtering (104c) or gamma-corrected (104d-f). The CVS 100 may combine EVS image streams 112 based on input from various onboard sensors 110 (FIG. 1A), e.g., by combining the EVS image streams 112 based on input from onboard sensors 110 configured for different EM spectral bands (visible-band, IR) but which "see" (e.g., sense EM radiation from within) a similar or identical FOV regardless of spectral band. For example, the CVS 100 may combine for display EVS image streams 112 to reflect the full FOV of both visible-band EVS sensors 110 and IR EVS sensors 110, or the CVS 100 may (via display electronics 108, FIG. 1A) continually analyze EVS image streams 112 to prioritize useful visual information (whether or not the information is provided by visible-band EM sensors) while de-emphasizing or discarding non-useful visual information. For example, the CVS 100 may prioritize EVS image streams 112 captured by an IR sensor 110 over those of visible-band sensors if atmospheric conditions are hazy, humid, or bright, and the visible-band sensors experience difficulty penetrating the atmospheric humidity or reflected sunlight. The combined EVS image streams 112 may be combined with synthetic images 120 generated by the SVS 106 (FIG. 1A) where the FOVs of the SVS 106 and EVS 104 overlap to generate a combined vision stream 128. For example, combined and filtered EVS image streams 112 may be overlaid with terrain mapping details (120a), masking of excluded areas (120b), colorization (120c), and symbology (120d) corresponding to the FOV of the SVS 106. The resulting combined vision stream 128 may be optimized for display (128a-b) by the HDD 114, HUD 116, or HWD 118 of the aircraft 102. For example, a combined vision stream 128a optimized for display via PFD or HDD 114 may include SVS colorization (120c) of monochrome visible-band or infrared EVS imagery (112), while a combined vision stream 128b optimized for display via HUD 116/HWD 118 may include luminous monochrome (e.g., green) displays on a black background. It is contemplated that, while the CVS 100 is configured to combine EVS imagery 112 and SVS synthetic imagery 120 associated with an identical or overlapping FOV (e.g., SVS symbology or imagery depicting a given FOV will align with EVS imagery of the same FOV), the alignment of SVS and EVS imagery may not be exact (e.g., due to position error).

Figure 1C:
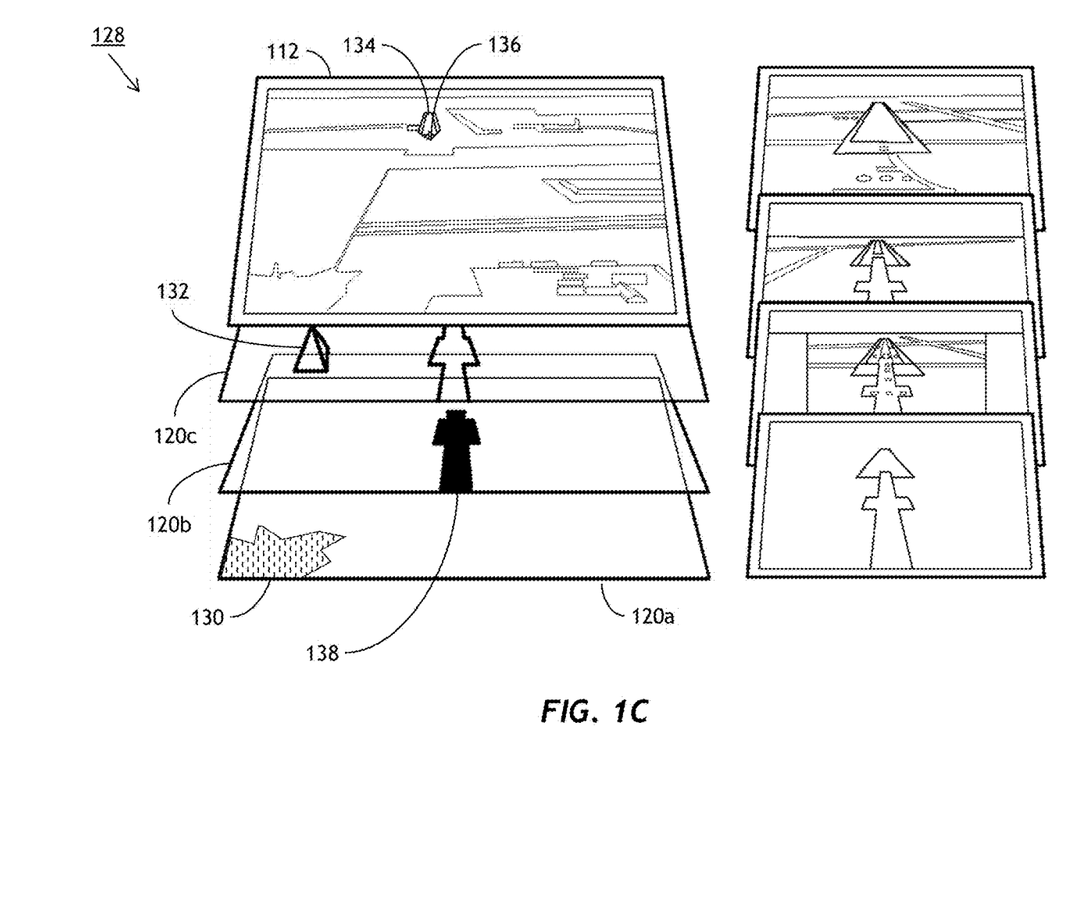
FIG. 1C is a diagrammatic illustration of exemplary SVS and EVS layering operations of the CVS of FIG. 1A according to the inventive concepts disclosed herein.

Referring to FIG. 1C, an exemplary embodiment of a combined vision stream 128 generated by the CVS 100 of FIG. 1A may comprise one or more layers generated by the SVS 106, opaquely or transparently overlaid on corresponding EVS image streams 112. For example, the SVS 106 may cross-reference captured EVS imagery 112 with SVS databases 126, generating a terrain layer (120a), a masking layer (120b) and a symbology layer (120d). For example, the terrain layer 120a may identify natural features 130 such as land, bodies of water, hills and mountains identified within the SVS FOV, while the symbology layer 120c may highlight or identify towers and other manmade features 132 or airfield features, e.g., runways 134 (including runway features, markings, and lighting) or ALS 136. The masking layer 120b may be generated by the SVS 106 when areas of the FOV of the combined vision stream 128 are identified for exclusion from the SVS vision stream (synthetic images 120). The CVS 100 may identify and exclude areas from the SVS vision streams in compliance with regulations mandating or precluding the use of certain visual information sources at particular positions or during particular flight segments. For example, when the aircraft 102 is on final approach to an assigned runway 134, flying at an altitude of more than 100 ft. AGL but under a predetermined decision height (e.g., 200-250 ft. AGL), FAA regulations mandate that certain prescribed visual references (e.g., those outlined by 14 CFR § 91.175, such as the ALS 136 of the assigned runway 134) must be identifiable via the CVS 100. Under 100 ft. AGL, the pilot of the aircraft 102 must be able to identify prescribed visual references solely via EVS imagery 112, without recourse to SVS synthetic imagery 120; otherwise the pilot must execute a missed approach. The CVS 100 may generate a masking layer 120b via the SVS 106 to exclude any areas in the FOV of the SVS associated with prescribed visual references, such as the ALS 136, the runway 134, the touchdown zone or threshold of the runway, or lighting and markings associated with the runway, such that the combined vision stream 128 may display only the EVS imagery 112 corresponding to the excluded areas 138. The CVS 100 may identify and exclude areas automatically based on the position of the aircraft 102 (e.g., when a decision altitude is reached), or the pilot may manually select areas to be excluded. The CVS 100 may gradually fade out SVS synthetic imagery 120 corresponding to excluded areas 138 (or, in the alternative, fade out all SVS imagery, resulting in pure EVS imagery 112 displayed by the CVS) as the aircraft 102 descends (or over a predetermined time window), so that a pilot viewing CVS displays via HWD 116 is not disoriented by the sudden shift in visual information.

Figure 2:
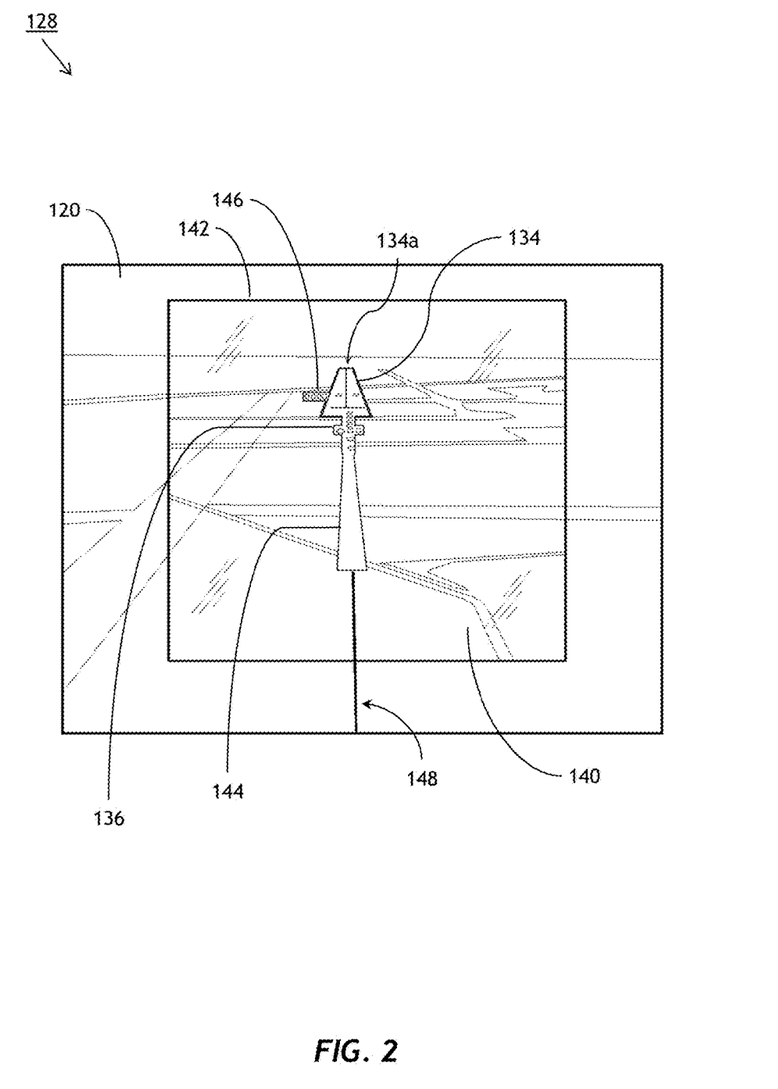
FIG. 2 is an illustration of an exemplary embodiment of a combined vision stream generated by the CVS of FIG. 1A.

Referring to FIG. 2, an exemplary embodiment of a combined vision stream 128 displayed by the CVS 100 of FIG. 1A is shown. The combined vision stream 128 may incorporate EVS imagery (112, FIG. 1C) as well as SVS synthetic imagery 120. The combined vision stream 128 displayed by the CVS 100 may include the full FOV of both the SVS 106 (FIG. 1A) and CVS 104 (FIG. 1A). The combined vision stream 128 may include overlap portions (140) within which the FOV of the SVS 106 and CVS 104 overlap (and within which both vision streams are displayed); the CVS 100 may display a boundary 142 between an overlap portion 140 of the combined vision stream 128 corresponding to a combined FOV (SVS and EVS) and a portion of the combined vision stream corresponding solely to the FOV of the SVS (SVS synthetic imagery 120). Synthetic imagery 120 generated by the SVS may include highlights or outlines (144) indicating an assigned runway 134, an ALS 136 of the assigned runway, or runway lighting 146 associated with the assigned runway. SVS synthetic imagery 120 may include a synthetic centerline 148 for orienting the aircraft 102 to the actual centerline 134a of the assigned runway 134 at approach distances.

Figure 3A:
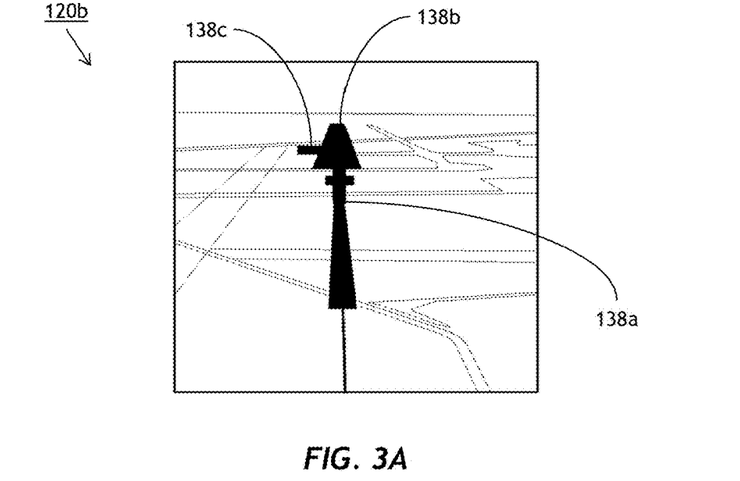
FIG. 3A is an illustration of an excluded area generated by the CVS of FIG. 1A.

Referring to FIG. 3A, an exemplary embodiment of an SVS masking layer 120b generated by the CVS 100 of FIG. 1A is shown. The SVS 106 (FIG. 1A) may identify excluded areas (138, FIG. 1C) corresponding to prescribed visual references which the pilot must identify solely via EVS imagery (112, FIG. 1C) to continue an approach when under 100 ft. AGL. For example, the excluded area 138a may correspond to the ALS 136 shown by FIG. 2, the excluded area 138b may correspond to the assigned runway 134 shown by FIG. 2, and the excluded area 138c may correspond to the runway lighting 146 shown by FIG. 2. The SVS 106 may identify excluded areas 138 of specific shape and size based on navigational information about the size, orientation, configuration, and placement of runways 134, ALS 136, runway lighting 146, and other features or markings specific to a particular airfield from the SVS database 126, cross-referencing airfield data with the determined position of the aircraft 102. It is contemplated that the sizes of excluded areas 138 based on runways 134, ALS 136, or other airfield features may be larger than the associated airfield features (e.g., an excluded area 138b may be 5-10 m larger on each side than the associated runway), so as to include the entire airfield feature within the excluded area and provide a small margin for error to ensure that the entire feature is excluded from SVS synthetic imagery 120. Similarly, the excluded areas 138 may allow the pilot to visually assess the alignment of SVS synthetic images 120 and EVS image streams 112. For example, referring back to FIG. 2, the synthetic centerline 148 may not align precisely with the actual centerline 134a of the assigned runway 134. The SVS 106 may determine the size of an excluded area 138 based on the specific size or configuration of an ALS 136, e.g., MALSR, MALSF, ALSF-I, Calvert, or other specific lighting configurations. The SVS 106 may visually identify an ALS 136 and thereby determine the exact configuration, setting the shape and size of the corresponding excluded area 138a accordingly. In the alternative (e.g., if the specific lighting configuration cannot be determined), the SVS 106 may default to a superset excluded area 138 of default shape and size, which corresponds to a generic ALS 136 in that any configuration of ALS or runway lighting 146 will fit into the superset excluded area. The EVS 104 may identify a potential excluded area by detecting an area or region which may approximate in shape or size, e.g., an ALS 136 or a particular configuration thereof, and forward the potential excluded area to the SVS 106 for further analysis and confirmation as an excluded area 138.

Figure 3B:
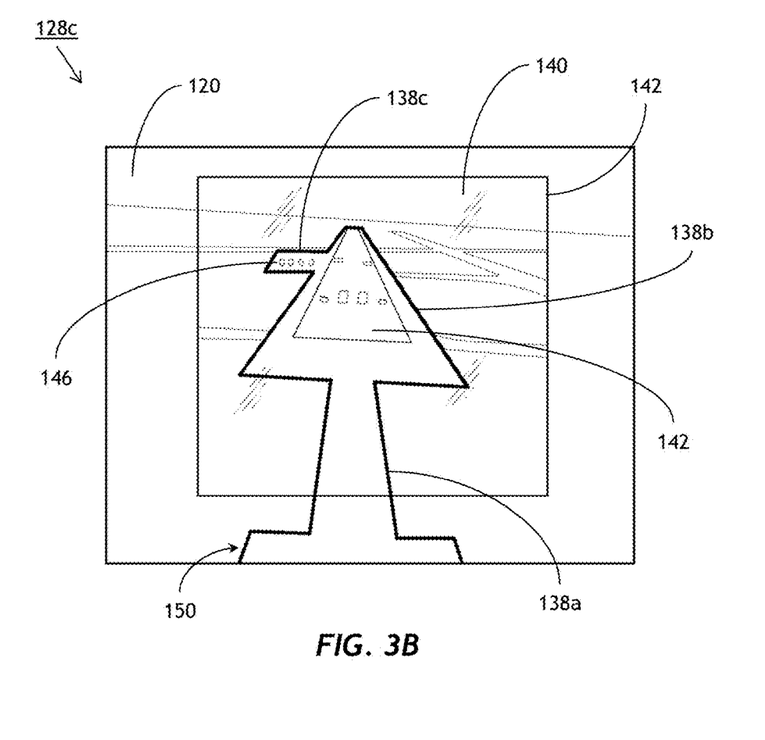
FIG. 3B is an illustration of an exemplary embodiment of a combined vision stream generated by the CVS of FIG. 1A incorporating the excluded area of FIG. 3A.

Referring to FIG. 3B, an exemplary embodiment of a combined vision stream 128c generated by the CVS 100 of FIG. 1A is shown. The combined vision stream 128c may function similarly to the combined vision stream 128 shown by FIG. 2, except that the combined vision stream 128c of FIG. 3B incorporates the masking layer 120b and excluded areas 138a-c shown by FIG. 3A. The CVS 100 may generate and display SVS synthetic images 120 as well as (within the overlap portion 140) simultaneous SVS and EVS imagery. Within the excluded areas 138a-c, however, the CVS 100 may display pure EVS imagery (112, FIGS. 1A-C) corresponding to the assigned runway 134, runway lighting 146, and ALS 136 (FIG. 2). The CVS 100 may display an excluded-area boundary 150 distinguishing excluded areas 138a-c from the overlap portion 140 in which the full combined vision stream 128c may be displayed. In addition, the CVS 100 may truncate any portion of the synthetic centerline 148 (FIG. 2) or any other synthetic image 120 generated by the SVS 106 encroaching upon an excluded area 138, to prevent synthetic images from interfering with pure-EVS imagery (112, FIGS. 1A-C) when its use is mandated and to assist the pilot or crew in assessing alignment or positioning errors between, e.g., the synthetic centerline 148 and the actual centerline 134a of the assigned runway 134.

Figure 4A:
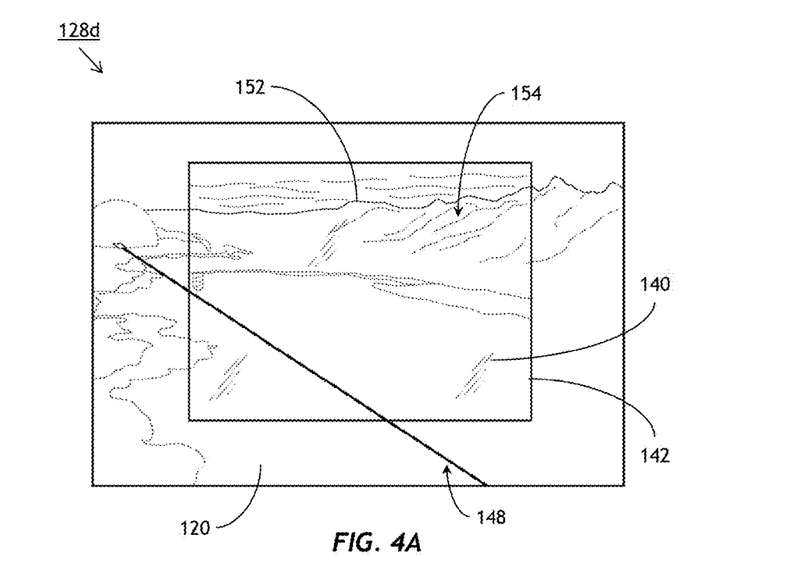
FIG. 4A is an illustration of an exemplary embodiment of a combined vision stream generated by the CVS of FIG. 1A.
Figure 4B:
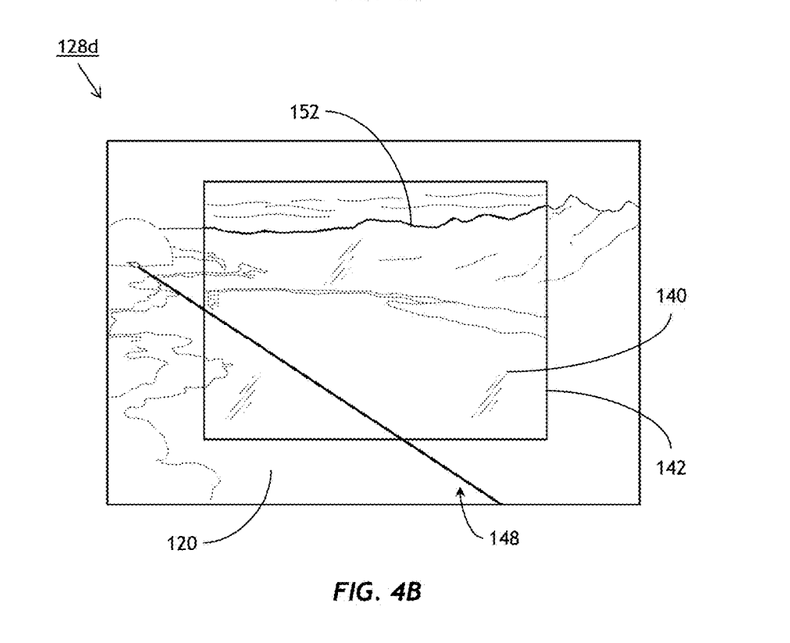
FIG. 4B is an illustration of the combined vision stream of FIG. 4A.

Referring to FIGS. 4A and 4B, an exemplary embodiment of a combined vision stream 128d generated by the CVS 100 of FIG. 1A is shown. The combined vision stream 128d may function similarly to the combined vision streams 128, 128c shown by FIGS. 2 and 3B respectively, except that in FIGS. 4A and 4B, the CVS 100 may enhance situational awareness by emphasizing synthetic images 120 corresponding to natural features 130 (FIG. 1C) that provide useful visual intelligence, while de-emphasizing non-useful, cluttering, or potentially distracting synthetic images corresponding to other natural features. For example, referring specifically to FIG. 4A, the ridgeline 152 shown by the combined vision stream 128d may be useful visual information to the pilot or crew of the aircraft 102 (FIG. 1A), as the ridgeline acts as a horizon distinguishing land from sky. However, other minor contours 154 may not be important to the aircraft 102. For example, if the pilot is viewing the combined vision stream 128d via a monochrome display such as a HUD 116 or HWD 118 (FIG. 1A), the additional glow provided by displaying the minor contours 154 may distract the pilot from more important visual information (e.g., the ridgeline 152). The SVS 106 (FIGS. 1A-C) may identify ridgelines 152 and minor contours 154 based on cross-referencing the position of the aircraft 102 with SVS terrain or navigation databases 126 (FIG. 1A). Referring to FIG. 4B, the SVS 106 may emphasize ridgelines 152 and de-emphasize unimportant or less important features such as minor contours 154, which may include removing the minor contours from SVS synthetic imagery 120 and consequently from the combined vision stream 128d entirely.

Figure 5:
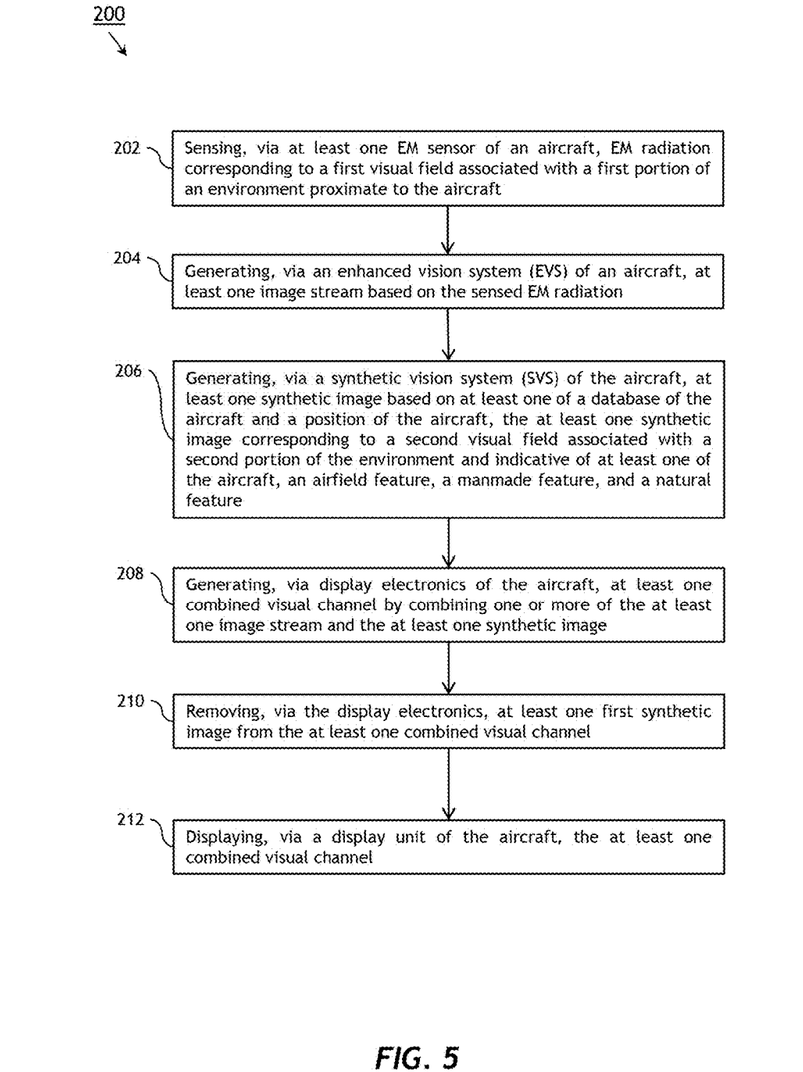
FIG. 5 is a process flow diagram illustrating an embodiment of a method according to the inventive concepts disclosed herein.

Referring now to FIG. 5, an exemplary embodiment of a method 200 for managing a combined vision stream displayed via a display unit of an aircraft according to the inventive concepts disclosed herein may be implemented by the CVS 100 in some embodiments, and may include one or more of the following steps. At a step 202, onboard sensors of the aircraft sense EM radiation corresponding to an FOV of the onboard sensors and associated with an environment proximate to or surrounding the aircraft.

At a step 204, an EVS of a CVS generates image streams based on the sensed EM radiation. The EVS may further filter, correct, enhance, or otherwise process the sensed images via an EVS processor.

At a step 206, an SVS of the CVS generates synthetic images based on information in SVS navigation and terrain databases and the determined position of the aircraft, the synthetic images corresponding to an FOV of the SVS associated with a portion of the aircraft environment. The synthetic images may be generated by a SVS processor and indicate the aircraft, airfield features (such as a runway, ALS, or runway lighting), manmade features, or natural features.

At a step 208, display electronics of the CVS of the aircraft generate a combined vision stream (visual channel) by combining the image streams generated by the EVS and the synthetic images generated by the SVS. For example, the EVS may extract data from the sensed images. The display electronics may select (via a processor) one or more EVS image streams for combination based on the extracted visual information, and may select SVS imagery for combination based on the selected EVS image streams (e.g., by selecting SVS imagery having a FOV matching that of the selected EVS imagery).

At a step 210, the display electronics remove synthetic images from the combined vision stream. For example, the CVS may identify excluded areas within the aircraft environment (e.g., indicative of airfield features such as an ALS, an individual ALS lighting element (component, barrette), the runway or a portion thereof, or runway lighting). Excluded areas may be identified by onboard sensors or based on data retrieved from SVS databases. The display electronics may remove SVS imagery corresponding to natural features (i.e., minor contours) while emphasizing ridgelines. The display electronics may gradually fade synthetic images from the combined vision stream, e.g., as the aircraft descends within a predetermined altitude range or over a predetermined time window.

At a step 212, a display unit of the aircraft displays the combined vision stream. For example, the combined vision stream may be displayed via PFD or HDD, via HUD, or via HWD.

As will be appreciated from the above, systems and methods according to embodiments of the inventive concepts disclosed herein may enhance situational awareness by optimizing the visibility of runway lighting systems to approaching aircraft, especially under adverse conditions (e.g., humid atmosphere, bright sunlight) where visible-band LED emissions may be overwhelmed by background illumination, rendering it difficult for cameras and image sensors to accurately detect or locate the approach lighting system. The modulated lighting infrastructure system allows airport facilities to use lower-energy (and thus lower-cost) LED-based approach lighting systems. At the same time, efficient use can be made of the energy deployed to LED-based lighting systems by maximizing visibility by onboard enhanced vision systems while preserving compliance with brightness specifications for pilot visibility.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for managing images displayed via a display unit of an aircraft, comprising:
    an enhanced vision system (EVS) configured to generate at least one image stream based on electromagnetic (EM) radiation sensed by an EM sensor of an aircraft, the at least one image stream corresponding to a first visual field associated with a first portion of an environment proximate to the aircraft;
    a synthetic vision system (SVS) configured to generate:
        at least one synthetic image based on at least one of a) a database of the aircraft and b) a first position of the aircraft, the at least one synthetic image 1) corresponding to a second visual field associated with a second portion of the environment, and 2) indicative of at least one of the aircraft, an airfield feature, a manmade feature, and a natural feature; and
        at least one masking layer defining a third portion of the environment and corresponding to one or more segments of the at least one synthetic image where such one or more segments correspond to features that are mandatorily visible via EVS based on a phase of flight; and
    display electronics coupled to the EVS, the SVS, and to at least one display unit of the aircraft, the display electronics configured to generate at least one combined visual channel for display by the at least one display unit by combining the at least one image stream, the at least one masking layer, and the at least one synthetic image, such that the segments of the synthetic image corresponding to the third portion are excluded from the combined visual channel.

2. The system of claim 1, wherein the at least one third portion corresponds to at least one of an approach lighting system (ALS), a lighting element of an ALS, a runway portion, and a lighting element of a runway portion.

3. The system of claim 1, wherein the at least one EM sensor is configured to identify the at least one third portion.

4. The system of claim 1, wherein the at least one third portion is retrieved from the at least one database based on the at least one first position.

5. The system of claim 1, wherein the display electronics are configured to generate the at least one combined visual channel by
 extracting visual information from the at least one image stream;
 selecting the at least one image stream for display based on the extracted visual information; and
 selecting the at least one synthetic image based on the at least one selected image stream.

6. The system of claim 1, wherein:
 the at least one first visual field corresponds to at least one of a) a second position of the at least one imaging sensor, b) a first range of the at least one imaging sensor, and c) a characteristic of the at least one imaging sensor; and
 the at least one second visual field corresponds to at least one of a) the first position, b) a second range determined by the SVS, and c) an orientation determined by the SVS.

7. The system of claim 6, wherein the characteristic of the at least one imaging sensor includes at least one of an infrared (IR) imaging sensor, a multispectral imaging sensor, a radar sensor, and a millimeter-wave (mmW) sensor.

8. The system of claim 1, wherein:
 the at least one synthetic image includes at least one second synthetic image having a fourth portion corresponding to the third portion, and
 the display electronics are configured to remove the at least one fourth portion from the combined visual channel.

9. The system of claim 1, wherein the display electronics are configured to remove from the at least one combined visual channel at least one synthetic image element based on the first position.

10. The system of claim 9, wherein the display electronics are configured to gradually fade the at least one synthetic image element from the at least one combined visual channel based on at least one change in the first position.

11. The system of claim 9, wherein the at least one synthetic image element is indicative of the at least one natural feature.

12. The system of claim 1, wherein the at least one synthetic image includes at least one synthetic boundary separating the at least one first visual field from the at least one second visual field.

13. The system of claim 1, wherein the at least one display unit includes at least one of a primary flight display (PFD), a head-down display (HDD), a head-up display (HUD), and a head-worn display (HWD).

14. An apparatus for managing images displayed via a display unit of an aircraft, comprising:
 at least one electromagnetic (EM) sensor of an aircraft, the at least one EM sensor configured to sense EM radiation corresponding to a first visual field associated with a first portion of an environment proximate to the aircraft;
 an enhanced vision system (EVS) coupled to the at least one EM sensor, the EVS including at least one first processor configured to generate at least one image stream based on the sensed EM radiation;
 a synthetic vision system (SVS) coupled to at least one position sensor of the aircraft, the SVS including at least one navigation database, the SVS including at least one second processor configured to generate:
  at least one synthetic image based on at least one of a) a position of the aircraft determined by the at least one position sensor and b) the at least one navigation database, the at least one synthetic image 1) corresponding to a second visual field associated with a second portion of the environment and 2) indicative of at least one of the aircraft, an airfield feature, a manmade feature, a natural feature; and
  at least one masking layer defining a third portion of the environment and corresponding to one or more segments of the at least one synthetic image where such one or more segments correspond to features that are mandatorily visible via EVS based on a phase of flight;
 display electronics coupled to the EVS and to the SVS, the display electronics including at least one third processor configured to generate at least one combined vision stream, the at least one combined vision stream including the at least one image stream, the at least one masking layer, and the at least one synthetic image, such that the segments of the synthetic image corresponding to the third portion are excluded from the combined visual stream; and
 at least one display unit of the aircraft, the at least one display unit coupled to the display electronics and configured to display the at least one combined vision stream.

15. A method for managing images displayed via a display unit of an aircraft, the method comprising:
 sensing, via at least one electromagnetic (EM) sensor of an aircraft, EM radiation corresponding to a first visual field associated with a first portion of an environment proximate to the aircraft;
 generating, via an enhanced vision system (EVS) of an aircraft, at least one image stream based on the sensed EM radiation;
 generating, via a synthetic vision system (SVS) of the aircraft, at least one synthetic image based on at least one of a database of the aircraft and a position of the aircraft, the at least one synthetic image 1) corresponding to a second visual field associated with a second portion of the environment and 2) indicative of at least one of the aircraft, an airfield feature, a manmade feature, and a natural feature;
 generating, via the synthetic vision system (SVS) of the aircraft, at least one masking layer defining a third portion of the environment and corresponding to one or more segments of the at least one synthetic image where such one or more segments correspond to features that are mandatorily visible via EVS based on a phase of flight;
 generating, via display electronics of the aircraft, at least one combined visual channel by combining the at least one image stream, the at least one masking layer, and the at least one synthetic image such that the segments of the synthetic image corresponding to the third portion are excluded from the combined visual channel; and
 displaying, via a display unit of the aircraft, the at least one combined visual channel.

16. The method of claim 15, wherein generating, via display electronics of the aircraft, at least one masking layer defining a third portion of the environment and corresponding to one or more segments of the at least one synthetic image includes:
  extracting visual information from the at least one image stream;
  selecting for combination one or more second image streams of the at least one image stream based on the extracted visual information; and
  selecting for combination at least one first synthetic image of the one or more synthetic images based on the one or more selected second image streams.

17. The method of claim 15, wherein generating, via the display electronics, at least one combined visual channel includes:
  identifying at least one third portion of the environment; and
  removing from the at least one combined visual channel the at least one first synthetic image corresponding to the at least one third portion.

18. The method of claim 17, wherein identifying at least one third portion of the environment includes at least one of:
  identifying, via the at least one EM sensor, the at least one third portion corresponding to at least one of an approach lighting system (ALS), a lighting element of an ALS, a runway portion, and a lighting element of a runway portion; and
  retrieving, from the at least one database, the at least one third portion corresponding to at least one of an approach lighting system (ALS), a lighting element of an ALS, a runway portion, and a lighting element of a runway portion.

19. The method of claim 17, wherein removing from the at least one combined visual channel the at least one first synthetic image corresponding to the at least one third portion includes:
  identifying the at least one first synthetic image having a) a fourth portion corresponding to the at least one third portion and b) a fifth portion not corresponding to the at least one third portion; and
  removing the at least one fourth portion from the combined visual channel.

20. The method of claim 15, wherein generating, via the display electronics, at least one combined visual channel includes at least one of:
  removing, via the display electronics, at least one first synthetic image indicative of the at least one natural feature from the at least one combined visual channel; and
  gradually fading the at least one first synthetic image from the at least one combined visual channel based on at least one change in the position of the aircraft.

* * * * *